(12) United States Patent
Padhi

(10) Patent No.: US 12,737,358 B2
(45) Date of Patent: Sep. 15, 2026

(54) QUERY PLAN ADAPTATION USING QUERY PLAN FRAGMENTS

(71) Applicant: Salesforce, Inc., San Francisco, CA (US)

(72) Inventor: Gyana Ranjan Padhi, Hyderabad (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/423,910

(22) Filed: Jan. 26, 2024

(65) Prior Publication Data

US 2025/0245224 A1 Jul. 31, 2025

(51) Int. Cl.
*G06F 16/2453* (2019.01)

(52) U.S. Cl.
CPC .............................. *G06F 16/24542* (2019.01)

(58) Field of Classification Search
CPC ................................................ G06F 16/24542
See application file for complete search history.

(56) References Cited

U.S. PATENT DOCUMENTS 10,628,419 B2 * 4/2020 Dees ................. G06F 16/24542
11,216,462 B1 * 1/2022 Jain .................. G06F 16/24542
2003/0172059 A1 * 9/2003 Andrei .............. G06F 16/24537
2008/0256024 A1 * 10/2008 Downer ............ G06F 16/24542
2008/0281779 A1 11/2008 Day et al.
2010/0250518 A1 9/2010 Bruno et al.
2011/0082854 A1 4/2011 Eidson et al.
2011/0282864 A1 11/2011 Collins et al.
2016/0062870 A1 3/2016 Menahem et al.
2017/0091269 A1 * 3/2017 Zhu ....................... G06F 16/258
2018/0218040 A1 * 8/2018 Penmetsa .......... G06F 16/24547
2019/0236188 A1 8/2019 McKenna
2021/0240710 A1 8/2021 Korlapati et al.

* cited by examiner

*Primary Examiner* — Brittany N Allen

(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to determining query plans for execution by database systems. In various embodiments, a query optimizer determines a first query plan to implement a query requesting data from a database system. The determining includes selecting one of a plurality of query plans evaluated based on a cost analysis and caching plan fragments of the unselected query plans. The database system can then determine a second query plan for the query by replacing a plan fragment in the first query plan with one of the cached plan fragments of the unselected query plans.

19 Claims, 7 Drawing Sheets

QUERY PLAN ADAPTATION USING QUERY PLAN FRAGMENTS

BACKGROUND

Technical Field

This disclosure relates generally to database systems, and, more specifically, to determining query plans.

Description of the Related Art

A query submitted to a database system typically expresses a desired result of a query, but not the implementation details on how to obtain the result. For example, a query requesting a join of tables A, B, and C may be implemented as 1) a join of A and B followed by a join of the result and C or 2) a join of B and C followed by a join of A and the result. Modern database systems typically employ a query optimizer that receives a parsed query and evaluates different query plans to determine an appropriate plan for executing a query. This evaluation may include determining scores for each plan based on estimated computational and storage costs and selecting the plan with the best score. Accordingly, a query optimizer might provide a better score to the second plan noted above if the result of joining B and C produced a smaller temporary table than the result of joining A and B.

DETAILED DESCRIPTION

Determining a query plan for a given query can consume considerable processor and memory resources as multiple plans are determined and evaluated before a particular plan is selected for execution. To reduce overhead, the selected query plan may be cached, so that it does not need to be determined again each time the query is subsequently received. If, however, a cached plan is not achieving the desired results, any modification of this plan can require performing the whole determination process again as work related to other unselected plans is traditionally thrown away once a query plan is selected for a given query. Thus, significant work may be repeated any time a previously selected plan is modified to address some issue such as taking too long to execute, consuming too much memory, etc.

The present disclosure describes embodiments in which query plan fragments of unselected query plans are cached to aid in subsequent plan modifications. As will be described below in various embodiments, a query optimizer of database system can determine a first query plan to implement a given query requesting data from the database system. Although the query optimizer may select only one of multiple query plans evaluated based on a cost analysis, the query optimizer caches plan fragments of the unselected query plans. If this first query plan is not producing the desired results, a second query plan can be determined for the query by replacing one or more plan fragments in the first query plan with one or more of the cached plan fragments of the unselected query plans. For example, the first query plan might include an initial plan fragment corresponding to a hash join of two tables. The query optimizer, however, may have evaluated another plan that performed a merge join but decided not to select this plan as it was deemed to have a higher performance cost. If the hash join was later determined to be problematic, the database system can modify the first plan by replacing the initial fragment with the fragment performing the merge join from the other plan. In doing so, the database system is able to determine this new plan without having to repeat the process used to determine the original plan-thus reducing the resources consumed to determine the new plan.

In some embodiments discussed below, modification of query plans is performed automatically by the database system based on various performance metrics tracked by the database system-enabling the database to diagnose and remediate problematic query plans. The database system may also perform multiple modifications to a given query plan to determine multiple additional plans, which can be evaluated to determine a best plan for subsequent executions of a given query. Query plans for different queries can also share plan fragments if they share overlapping work allowing plans to have a smaller memory footprint.

Figure 1:
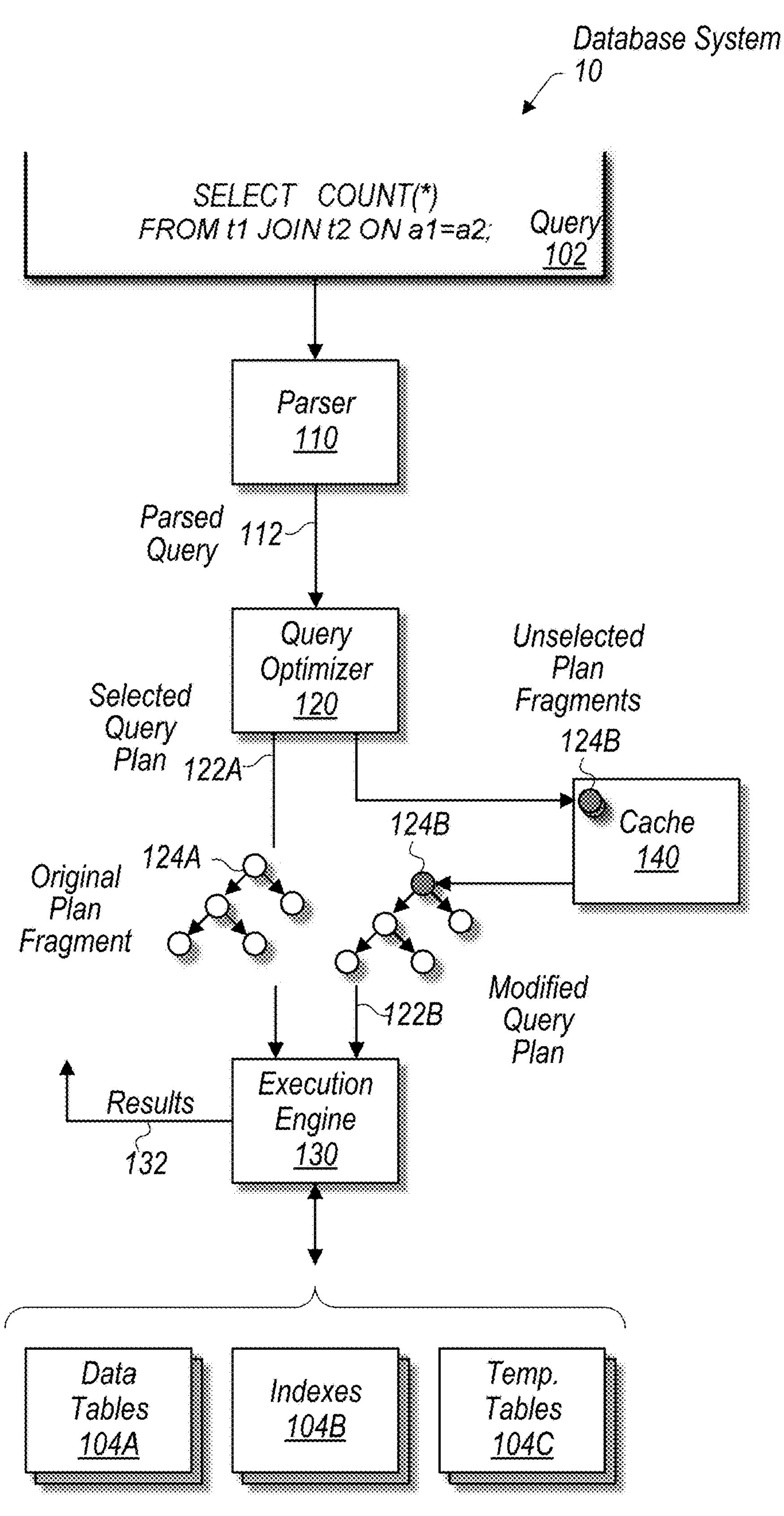
FIG. 1 is a block diagram illustrating one embodiment of a database system that supports caching query plan fragments of multiple query plans determined for a given query.

Turning now to FIG. 1, a block diagram of a database system 10 that caches query plan fragments of unselected query plans is depicted. In the illustrated embodiment, database system 10 includes tables 104, parser 110, query optimizer 120, execution engine 130, and cache 140. In some embodiments, database system 10 may be implemented differently than shown such as including more (or fewer) components.

Database system 10 may correspond to any suitable database system. In some embodiments, system 10 is a relational database management system (RDBMS), which may be implemented using, for example, Oracle™, MySQL™, Microsoft™ SQL Server, PostgreSQL™, IBM™ DB2, etc. Accordingly, system 10 may be configured to store data in one or more data tables 104A for servicing queries 102. System 10 may also maintain one or more indexes 104B usable to facilitate retrieving data from data tables 104A, and may generate temporary tables 104C in response to servicing queries 102. In the illustrated embodiment, queries 102 are expressed using structured query language (SQL); in other embodiments, other query declarative languages may be supported. In some embodiments, database system 10 may include a multi-tenant database, such as discussed below with FIG. 5, in which multiple tenants may each store a respective set of data in the database. For example, the multi-tenant database may include a first set of data belonging to a non-profit organization (e.g., a first tenant) and a set of data belonging to a company (e.g., a second tenant). In such an embodiment, database system 10 may employ various security measures to ensure that one tenant's data set is isolated from another's data set in order to prevent one tenant from accessing another tenant's data.

Parser 110 is a set of program instructions executable to parse a submitted query 102. In some embodiments, this parsing may include performing a syntax analysis of the clauses within a query 102. This parsing may further include assembling a data structure, shown as a parsed query 112, that can be processed by query optimizer 120 such an expression tree.

Query optimizer 120 is a set of program instructions executable to generate a query execution plan 122 for a given query 102, which includes evaluating various query plans 122 and selecting one to implement the query 102. Optimizer 120 may use any suitable algorithm to evaluate and select plans 122. In some embodiments, optimizer 120 may use a heuristic algorithm in which query plans 122 are assessed based on a set of rules provided to optimizer 120. In other embodiments, optimizer 120 uses a cost-based algorithm in which optimizer 120 performs a cost analysis that includes assigning scores to query plans 122 based on an estimated processor consumption, an estimated memory consumption, an estimated execution time, etc. These estimates may further be based on various metrics such as the number of distinct values in table columns, the selectivity of predicates (the fraction of rows the predicate would qualify), the cardinalities (e.g., row counts) of tables 104, etc. Based on the scores, optimize 120 may then select a query plan 122 that has the best score. In still other embodiments, optimizer 120 may use a combination of heuristic and cost-based algorithms.

Execution engine 130 is a set of program instructions executable to execute the selected plan 122. Accordingly, engine 130 may perform the various actions listed in the plan 122, which may include accessing one or more data tables 104A, indexes 104B, and/or temporary tables 104C. Engine 130 may then return any results 132 to service query 102. To avoid the costs of query optimizer 120 determining a new query plan 122 each time a given query 102 is received again, query optimizer 120 may store the plan 122 in cache 140, which may be accessible to execution engine 130 for reuse of the plan 122. As noted above, however, merely caching a selected plan 122 is unhelpful if a modification of the plan 122 is later desired.

In various embodiments, query optimizer 120 is further executable to preserve its work with respect to determining unselected plans 122 by storing plan fragments 124B of unselected query plans 122 in cache 140. A given plan fragment 124 can correspond to any suitable portion of a plan 122 such as an individual step/action in a plan 122 or set of interrelated steps/actions. In the illustrated embodiment, plans 122 are depicted as tree data structures based the interdependencies of plan fragments 124 as a parent fragment 124 may have one or more children fragments 124 if the parent fragment 124 depends on the outputs of actions associated with the children fragments 124. For example, a parent fragment 124 comparing values retrieved from two tables may have two child fragments 124 each returning the values from reading a respective one of the tables 104. If modification of an initially selected query plan 122A by query optimizer 120 is later desired, one or more original plan fragments 124A in the plan 122A can be replaced with cached plan fragments 124B determined for unselected plans 122 to produce a modified query plan 122B. For example, in FIG. 1, the root node plan fragment of plan 122A has been placed in modified plan 122B. In some embodiments, query optimizer 120 may also modify a given query plan 122A to create and execute N number of alternative plans 122B using plan fragments 124B of unselected query plans until a plan matches one or more performance criteria-N, for example, being the number of substitute plan fragments 124B cached by query optimizer 120.

In various embodiments, query optimizer 120 also preserves the cost information determined from its cost analysis when evaluating different query plans 122 in order to aid in determining which cached plan fragments 124B should be used when replacing an original plan fragment 124A in an existing plan 122A. For example, an originally selected query plan 122A may include a plan fragment 124A identified as having a lowest cost. If this plan fragment 124A is later determined to not function as desired, database system 10 can, based on the preserved cost information in cache 140, select the cached plan fragment 124B identified as having the next lowest cost. An example of cost preservation is discussed in greater detail below with FIG. 3B. By preserving plan fragments 124 of unselected plans 122 in cache 140, query optimizer 120 can significantly reduce the overhead for determining modified query plans 124 for a previously received query 102.

In some embodiments, query plan fragments 124 can also be shared between query plans 122 associated with different queries 102 if implementing those queries 102 includes performing one or more common actions—thus reducing memory consumed to store the plans 122. Thus, query optimizer 120 may also be able to use one or more cached plan fragments 124 associated with a given query 102 to determine another query plan 122 for another query 102. In some embodiments, multiple query plans 122 with shared plan fragments 124 can also be determined for the same query 102 if particular tenants, users, etc. are experiencing issues with a particular plan 122.

Modification of query plans 122 may be performed in response to any suitable conditions. In some embodiments, database system 10 provides a user interface and supports receiving, via the user interface, a request to modify a selected query plan 122A. For example, a database administrator may request that a given query 102 not be implemented using a hash join causing system 10 to determine a modified query plan 122B using another type of join. In some embodiments, database system 10 supports query hints in which query optimizer directives can be embedded in a query 102 using the delimiters/* hint content */to control particular behaviors of query optimizer 120 such as implementing a data retrieval using a particular index. As will be described next with FIG. 2, in some embodiments, execution engine 130 collects one or more performance metrics from an execution of a query plan 122 and determines whether to modify the query plan 122 in response to the one or more performance metrics satisfying one or more criteria.

Figure 2:
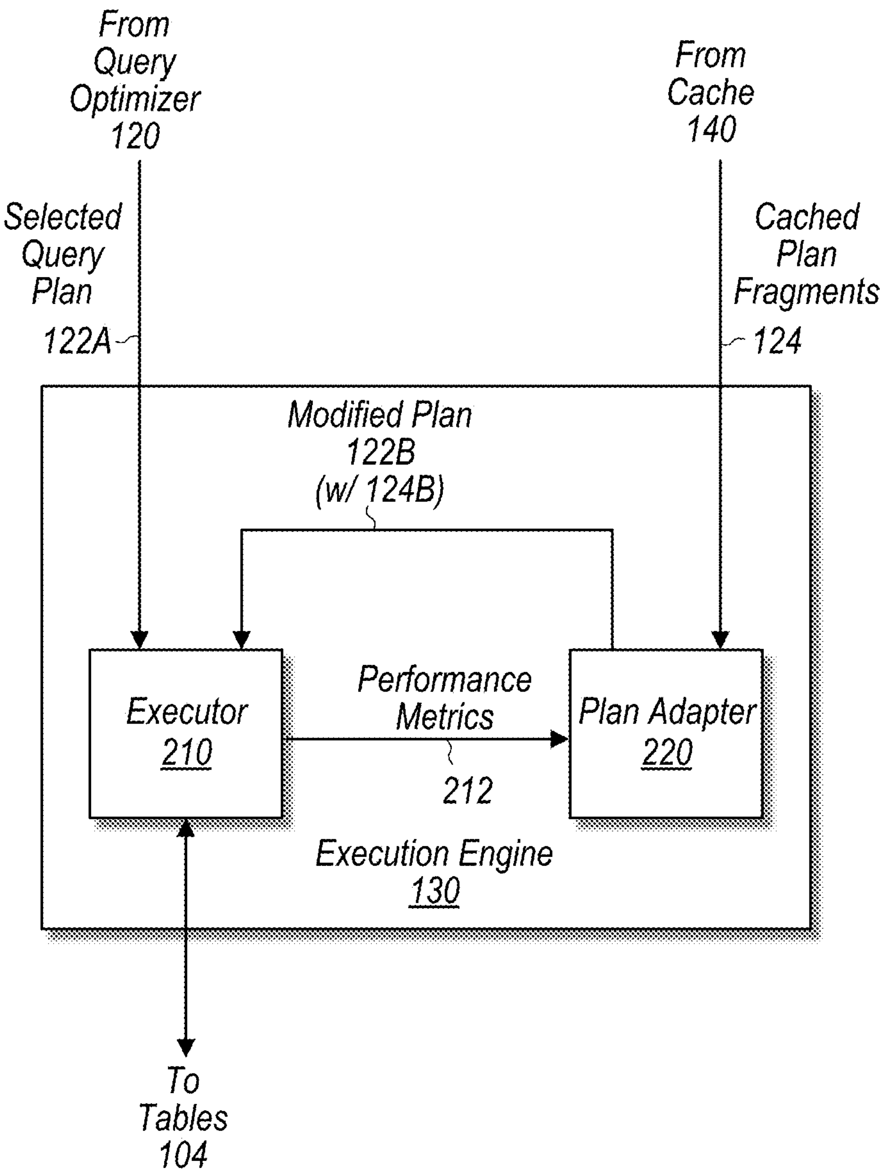
FIG. 2 is a block diagram illustrating one embodiment of an execution engine that can modify a previously selected query plan for a given query using cached plan fragments of alternative query plans for the query.

Turning now to FIG. 2, a block diagram of execution engine 130 using cached plan fragments 124 is shown. In the illustrated embodiment, execution engine 130 includes an executor 210 and a plan adapter 220. In other embodiments, execution engine 130 may be implemented differently than shown such as plan adapter 220 being located elsewhere in database system 10 such as in query optimizer 120.

Executor 210 is a set of program instructions in engine 130 responsible for executing a received plan 122 including performing the actions defined in the plan 122 such as accessing and processing data stored in tables 104. In the illustrated embodiment, executor 210 is further executable to track performance metrics 212 about an execution of a given query plan 122. Performance metrics 212 may include any of various metrics such as execution time, processor resources consumed, memory resources consumed, etc. Performance metrics 212 may also be collected on per plan 122 basis or on a per fragment 124 basis. Still further, performance metrics 212 may be tracked on a per tenant or per user basis. To track these metrics 212 on this greater level of granularity, in some embodiments, execution engine 130 receives user information identifying a source of the query 102, which may be provided by the application sending the query 102. This information may, for example, identify a particular user was executing the application that issued the query 102 at a particular time as well as include other contextual information. This information may be useful in identifying that a particular plan 122 performs poorly for a particular user (or a particular tenant) but not other users. In some embodiments, database system 10 presents performance metrics 212 via a user interface to aid an administrator. In the illustrated embodiment, executor 210 provides these metrics 212 to plan adapter 220.

Plan adapter 220 is a set of program instructions executable to modify query plans 122. To determine whether a given plan 122 should be modified, in the illustrated embodiment, plan adapter 220 evaluates performance metrics 212 against one or more criteria. For example, plan adapter 220 may determine that a performance metric 212 for a particular plan fragment 124A is exceeding a predefined threshold and replace the plan fragment 124A in the query plan 122 with a cached plan fragment 124B from cache 140. Plan adapter 220 may then provide the modified plan 122B to executor 210 for execution (or to cache 140 for retrieval when the query 102 is subsequently received). In various embodiments, plan adapter 220 can further receive performance metrics 212 about the modified plan 122B's execution and continue to modify the plan 122B to improve its performance using machine learning. In some embodiments, plan adapter 220 modifies a given plan 122A for a particular one or more users (or a particular tenant). For example, plan adapter 220 may determine, based on performance metrics 212, that a particular fragment 124 is performing poorly due to its execution time, processor consumption, memory consumption, etc. for a given user and produce a modified plan 122B with a replaced fragment 124 for that user. The originally selected plan 122A by query optimizer 120, however, may remain in use for all other users. An example of how a query plan 122 can be modified will be discussed next with FIGS. 3A and 3B in which the structure of a query plan 122 is presented.

Figure 3A:
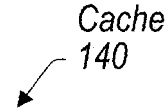
FIGS. 3A and 3B are block diagrams illustrating embodiments of a cached query plan using plan fragments.
Figure 3A:
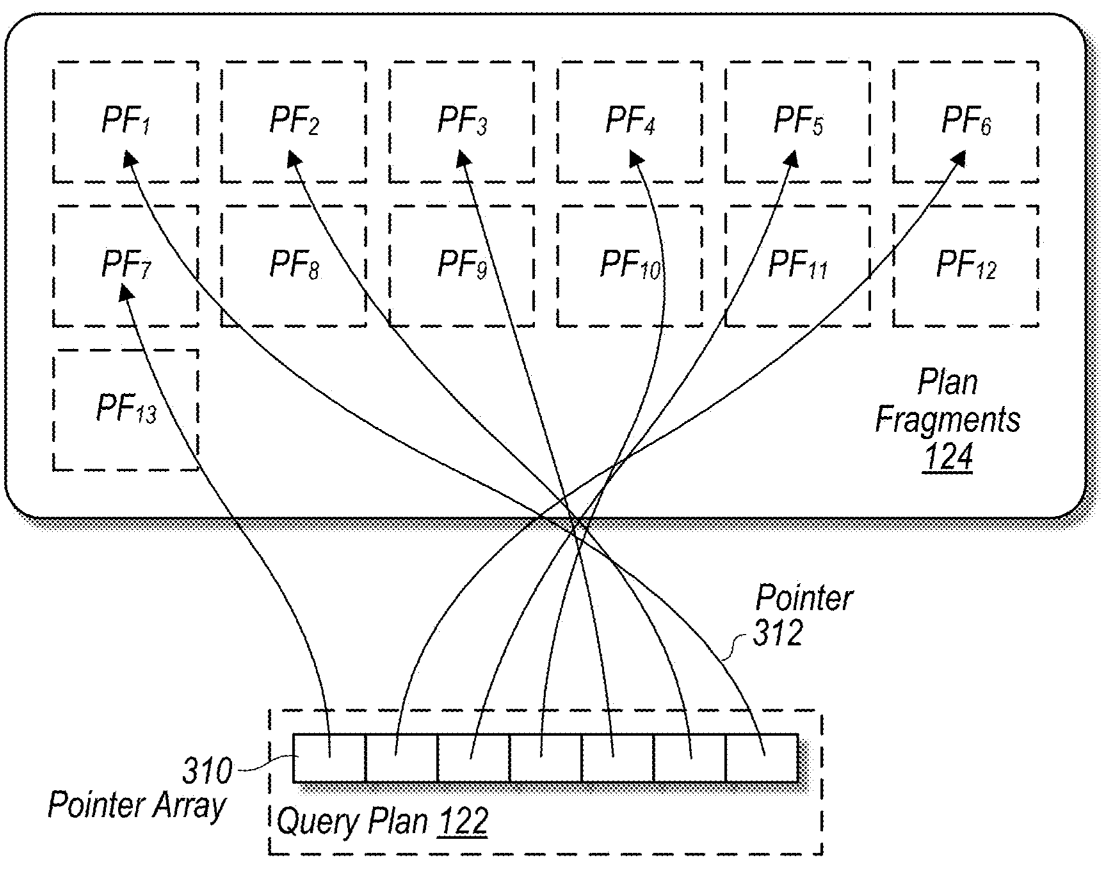

Turning now to FIG. 3A, a block diagram of a cached query plan 122 is depicted. Although query plan 122 may be implemented using any suitable data structure, in the illustrated embodiment, query plan 122 is stored in cache 140 as a pointer array 310 that includes pointers 312 identifying the plan fragments 124 relevant to the query plan 122. Accordingly, when a given plan 122 is received by execution engine 130, engine 130 may walk the entries in array 310 and traverse the memory addresses identified by pointers 312 to determine where the fragments 124 are located in cache 140. Execution engine 130 may then perform the actions defined in fragments 124 to execute the plan 122. In many instances, using pointer arrays 310 can greatly reduce the memory consumed by caching multiple plans 122 as two plans 122 sharing a plan fragment 124 can merely include two pointers 312 to that fragment 124 instead of caching two separate copies of the fragment 124 for each plan 122.

Modification of a given query plan 122 can also be easily implemented by modifying pointers 312 in pointer array 310. For example, cache 140 may include alternative plan fragments $PF_1$ and $PF_{11}$ for performing some action in implementing a query 102. A given query plan 122 may initially include a pointer 312 to $PF_1$, but plan adapter 220 may modify this pointer 312 to point to $PF_{11}$ if $PF_1$ is performing poorly. Using pointer array 310 can also allow for preservation of cost information associated with plan fragments 124 as will be discussed next.

Figure 3B:
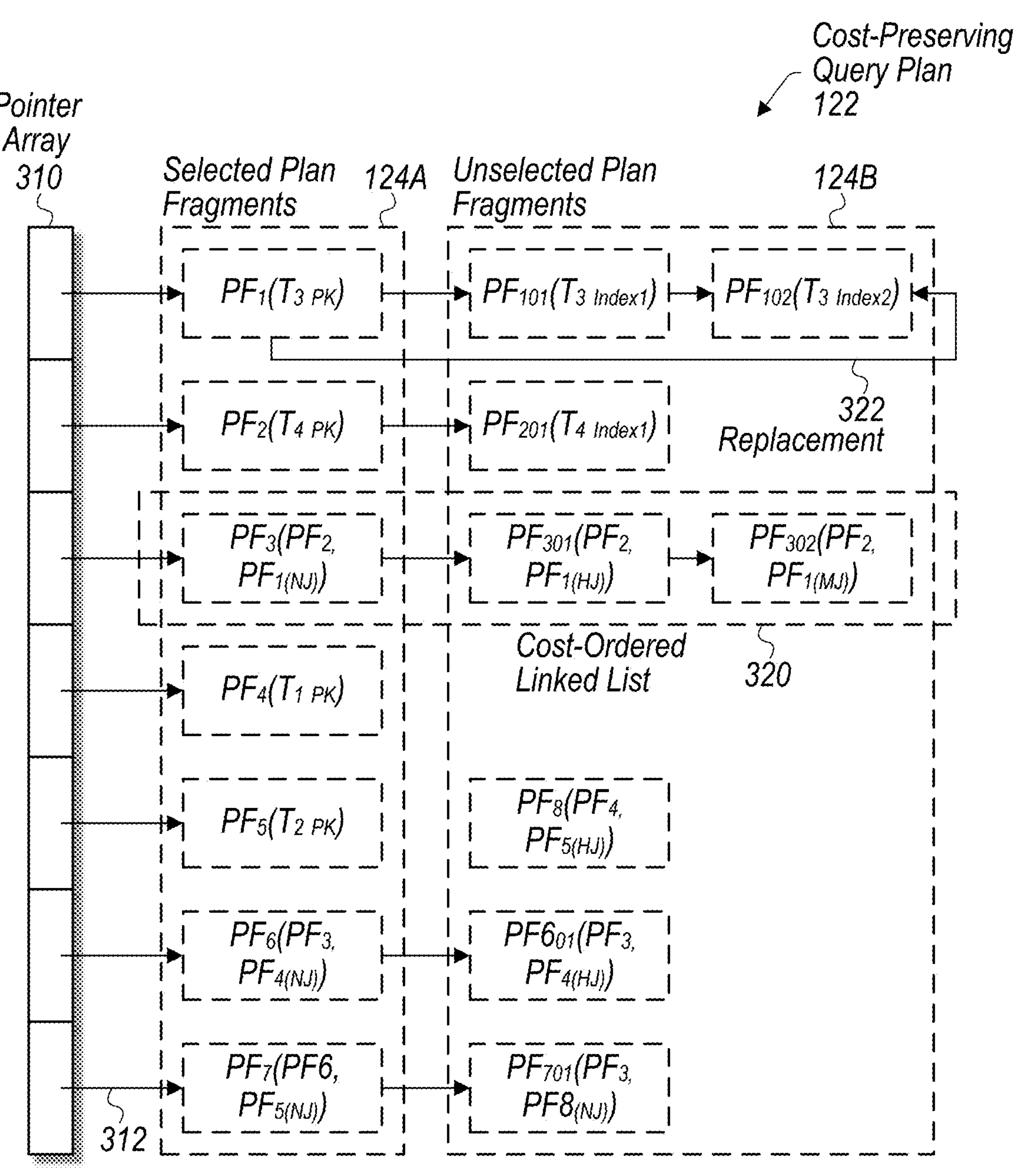

Turning now to FIG. 3B, a block diagram of a cost-preserving query plan 122 is depicted. In illustrated embodiment, pointer array 310 includes pointers 312 that point to linked lists 320 of one or more cached fragments 124 in which a given linked list 320 identifies alternative plan fragments 124 for perform one or more actions and is ordered based on their respect costs as determined by query optimizer 120. For example, as shown, a cost-ordered linked list 320 may include alternative plan fragments $PF_3$, $PF_{301}$, and $PF_{302}$ for performing a join action. $PF_3$ may perform a nested loop join (NJ) of the outputs of $PF_2$ and $PF_1$. $PF_{301}$ may alternatively perform a hash join (HJ) of the outputs of $PF_2$ and $PF_1$. $PF_{302}$ may alternatively perform a merge join (MJ) of the outputs of $PF_2$ and $PF_1$. Based on optimizer 120's cost analysis, $PF_3$ may be determined to have the lowest cost of $PF_3$, $PF_{301}$, and $PF_{302}$ and be positioned at the head of linked list 320. $PF_{301}$ may have the next lowest cost and be appended to $PF_3$ using another pointer 312. $PF_{302}$ may have the greatest cost and be appended using another pointer 312 to the tail of the linked list 320. Thus, at selection of a given query plan 122, plan fragments 124A located at the heads of linked lists 320 correspond to the best performing plan fragments 124 as determined by optimizer 120 and form the originally selected plan 122A to be executed by execution engine 130 while unselected plan fragments 124B corresponding to unselected plans are appended later in the linked lists 320.

If a selected plan fragment 124A is determined to be undesirable, in the illustrated embodiment, a replacement 322 of that fragment 124A can be performed by simply moving the plan fragment 124A to the tail of the linked list 320 such that the next best/lowest cost plan fragment 124B becomes the selected plan fragment 124 for the next execution of the plan 122. For example, as shown, a linked list 320 may include fragments $PF_1$ accessing a table T3 using primary keys (PK), $PF_{101}$ accessing Table T3 using an index 1, $PF_{102}$ accessing Table T3 using index 2. If $PF_1$ is taking too long to perform, the pointers 312 in the linked list 320 can be modified so that $PF_1$ becomes the tail and $PF_{101}$ corresponding to the next best fragment 124 becomes the new head of the linked list 320. If $PF_{101}$ is later determined to underperform, plan adapter 220 can rotate the ordering of the linked list 320, so that $PF_{102}$ becomes the selected plan fragment 124 performed during the next execution of the plan 122. By preserving cost information in this manner, plan modifications can be made quickly and efficiently performed.

In other embodiments, however, cost information may be preserved differently than depicted in FIG. 3B. For example, in another embodiment, cost values determined for particular plan fragments 124 may be stored as metadata within the fragments 124 such that the cost values can be easily accessed by plan adapter 220 when determining which fragments 124 to use in a modification.

Figure 4A:
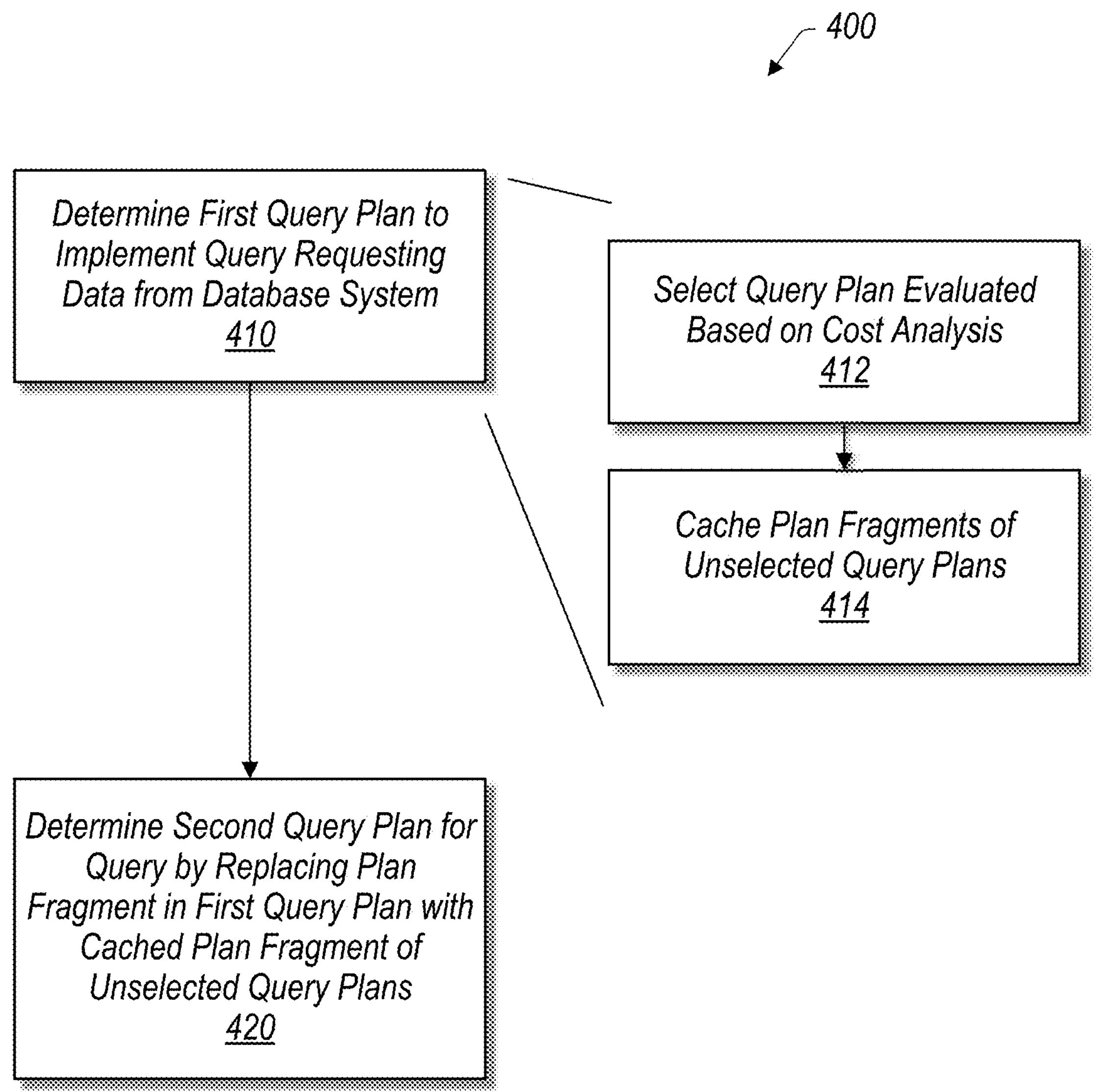
FIGS. 4A and 4B are flow diagrams illustrating embodiments of methods for using cached query plan fragments.

Turning now to FIG. 4A, a flow diagram of a method 400 is depicted. Method 400 is one embodiment of a method performed by a computing system implementing a database system supporting caching plan fragments such as database system 10. In many instances, method 400 can improve the performance of the database system.

In step 410, a query optimizer (e.g., query optimizer 120) of a database system determines a first query plan (e.g., selected query plan 122A) to implement a query (e.g., a query 102) requesting data from the database system.

In substep 412, the query optimizer selects one of a plurality of query plans evaluated based on a cost analysis. In some embodiments, the selecting includes selecting plan fragments identified in the cost analysis as having a lowest cost.

In substep 414, the query optimizer caches plan fragments (e.g., unselected plan fragments 124B) of the unselected query plans (e.g., in cache 140). In various embodiments, the caching includes preserving cost information for the cache plan fragments determined from the cost analysis. In various embodiments, preserving the cost information includes storing the cached plan fragments in an ordering (e.g., cost-ordered linked list 320) indicative of the costs using the cached plan fragments.

In step 420, a second query plan (e.g., modified query plan 122B) for the query is determined by replacing a plan fragment (e.g., original plan fragment 124A) in the first query plan with one of the cached plan fragments of the unselected query plans. In various embodiments, the replacing includes selecting a cached plan fragment for replacing the plan fragment in the first query plan based on the preserved cost information. In various embodiments, an execution engine (e.g., execution engine 130) of the database system collects one or more performance metrics (e.g., performance metrics 212) from an execution of the first query plan; the second query plan is determined in response to the one or more performance metrics satisfying one or more criteria. In some embodiments, the execution engine evaluates the one or more performance metrics and replaces the plan fragment in the first query plan with the one cached plan fragment. In some embodiments, the performance metrics are tracked for a given user; the second query plan is determined for the given user. In various embodiments, determining the second query plan includes selecting the cached plan fragment based on the cost analysis identifying the plan fragment having the next lowest cost. In some embodiments, the database system receives, via a user interface, a request to modify the first query plan; the determining the second query plan is performed in response to the request.

In some embodiments, method 400 further includes receiving, with the query, user information identifying a source of the query and, in response to the user information identifying the source as a particular set of users, causing execution of the second query plan to service the query.

In some embodiments, method 400 further includes storing the second query plan as a pointer array (e.g., pointer array 310) including a plurality of pointers to plan fragments stored in a cache. In some embodiments, a given one of the pointers points to a linked list that includes a selected plan fragment for an action and one or more alternative plan fragments for the action; the replacing includes altering an ordering of plan fragments in the linked list.

In some embodiments, method 400 further includes using one or more of the cached plan fragments to determine a third query plan for another query.

Figure 4B:
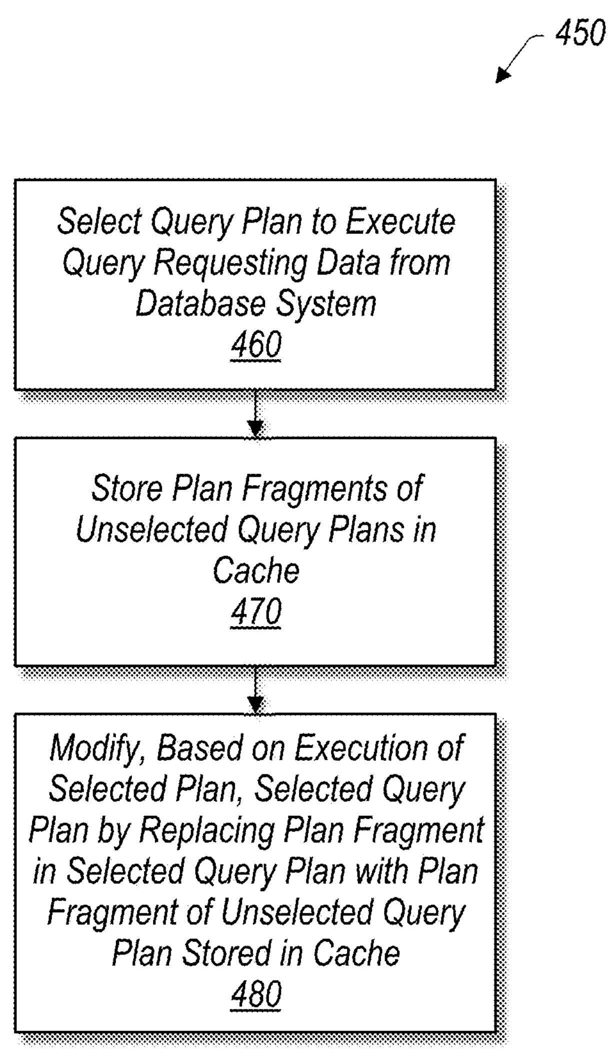

Turning now to FIG. 4B, a flow diagram of a method 450 is depicted. Method 450 is another embodiment of a method performed by a computing system implementing a database system supporting caching plan fragments such as database system 10. In many instances, method 450 can improve the performance of the database system.

In step 460, the database system selects one (e.g., selected query plan 122A) of a plurality of query plans to execute a query (e.g., query 102) requesting data from the database system.

In step 470, the database system stores plan fragments (e.g., unselected plan fragments 124B) of unselected ones of the query plans in a cache (e.g., cache 140). In some embodiments, the database system preserves cost information (e.g., via cost-ordered linked list 320) determined from the selecting of the plurality of query plans, the replacing being based on the cost information. In some embodiments, the database system stores the selected query plan as a pointer array (e.g., pointer array 310) including a plurality of pointers (e.g., pointers 312) to plan fragments stored in the cache, and the replacing includes modifying the pointer array.

In step 480, the database system modifies, based on an execution of the selected query plan, the selected query plan by replacing a plan fragment (e.g., original plan fragment 124A) in the selected query plan with one of the plan fragments of the unselected query plans stored in the cache. In some embodiments, the selecting is performed by a query optimizer (e.g., query optimizer 120) of the database system; the modifying is performed by an execution engine (e.g., execution engine 130) of the database system. In various embodiments, the database system determines two query plans for two different queries such that the two query plans share one or more plan fragments in the cache.

Exemplary Multi-Tenant Database System

Figure 5:
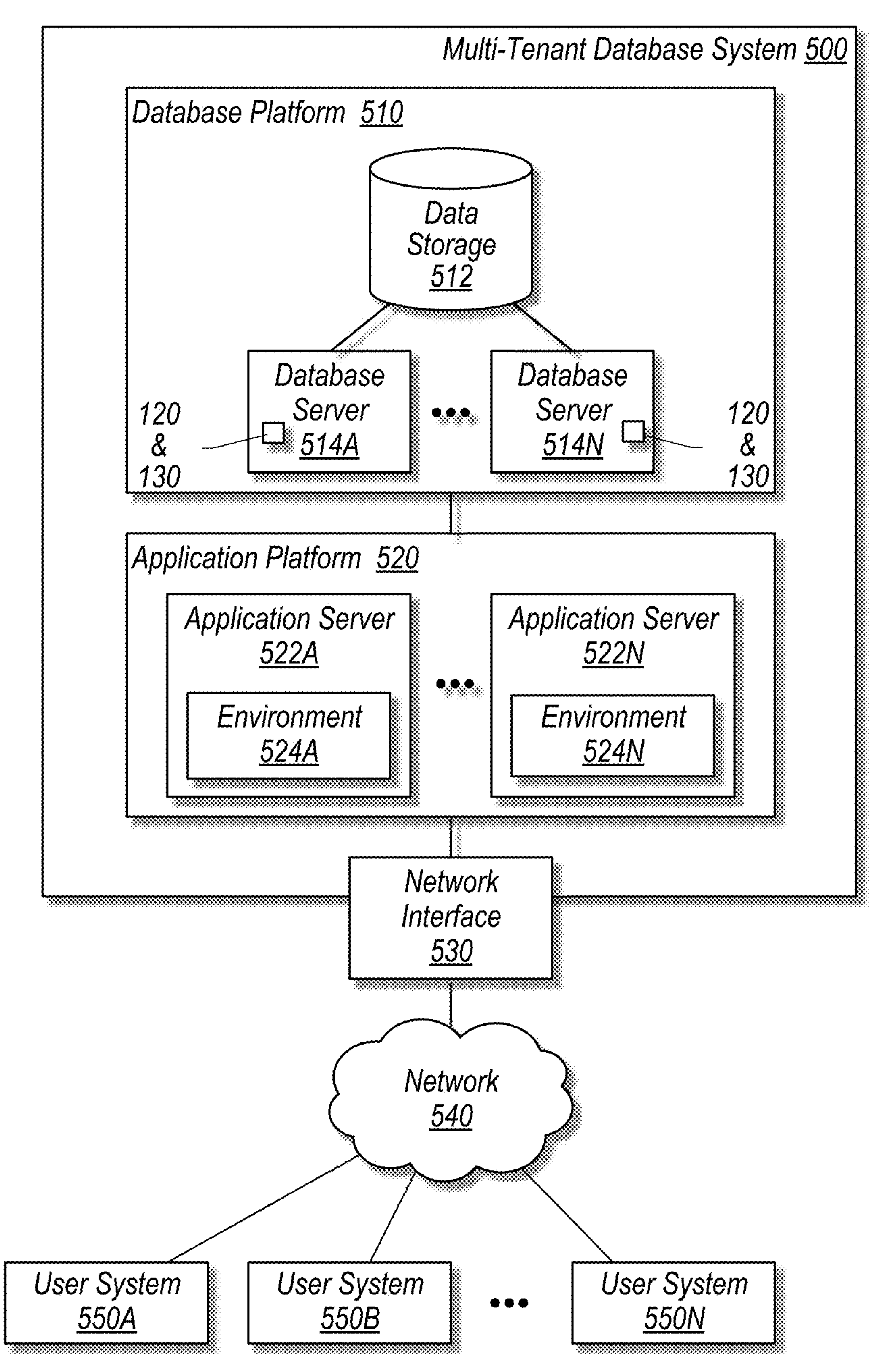
FIG. 5 is a block diagram illustrating one embodiment of an exemplary multi-tenant system for implementing various systems described herein.

Turning now to FIG. 5, an exemplary multi-tenant database system (MTS) 500, which may implement functionality of database system 10, is depicted. In the illustrated embodiment, MTS 500 includes a database platform 510, an application platform 520, and a network interface 530 connected to a network 540. Database platform 510 includes a data storage 512 and a set of database servers 514A-N that interact with data storage 512, and application platform 520 includes a set of application servers 522A-N having respective environments 524. In the illustrated embodiment, MTS 500 is connected to various user systems 550A-N through network 540. In other embodiments, techniques of this disclosure are implemented in non-multi-tenant environments such as client/server environments, cloud computing environments, clustered computers, etc.

MTS 500, in various embodiments, is a set of computer systems that together provide various services to users (or sets of users alternatively referred to as "tenants") that interact with MTS 500. In some embodiments, MTS 500 implements a customer relationship management (CRM) system that provides mechanism for tenants (e.g., companies, government bodies, etc.) to manage their relationships and interactions with customers and potential customers. For example, MTS 500 might enable tenants to store customer contact information (e.g., a customer's website, email address, telephone number, and social media data), identify sales opportunities, record service issues, and manage marketing campaigns. Furthermore, MTS 500 may enable those tenants to identify how customers have been communicated with, what the customers have bought, when the customers last purchased items, and what the customers paid. To provide the services of a CRM system and/or other services, as shown, MTS 500 includes a database platform 510 and an application platform 520.

Database platform 510, in various embodiments, is a combination of hardware elements and software routines that implement database services for storing and managing data of MTS 500, including tenant data. As shown, database platform 510 includes data storage 512. Data storage 512, in various embodiments, includes a set of storage devices (e.g., solid state drives, hard disk drives, etc.) that are connected together on a network (e.g., a storage attached network (SAN)) and configured to redundantly store data to prevent data loss. Data storage 512 may implement a single database, a distributed database, a collection of distributed databases, a database with redundant online or offline backups or other redundancies, etc. As part of implementing the database, data storage 512 may store one or more tables 104A-C having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 500 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, data storage 512 is organized as part of a log-structured merge-tree (LSM tree). As noted above, a database server 514 may initially write database records into a local in-memory buffer data structure before later flushing those records to the persistent storage (e.g., in data storage 512). As part of flushing database records, the database server 514 may write the database records into new files/extents that are included in a "top" level of the LSM tree. Over time, the database records may be rewritten by database servers 514 into new files included in lower levels as the database records are moved down the levels of the LSM tree. In various implementations, as database records age and are moved down the LSM tree, they are moved to slower and slower storage devices (e.g., from a solid-state drive to a hard disk drive) of data storage 512.

When a database server 514 wishes to access a database record for a particular key, the database server 514 may traverse the different levels of the LSM tree for files that potentially include a database record for that particular key. If the database server 514 determines that a file may include a relevant database record, the database server 514 may fetch the file from data storage 512 into a memory of the database server 514. The database server 514 may then check the fetched file for a database record having the particular key. In various embodiments, database records are immutable once written to data storage 512. Accordingly, if the database server 514 wishes to modify the value of a row of a table (which may be identified from the accessed database record), the database server 514 writes out a new database record into the buffer data structure, which is purged to the top level of the LSM tree. Over time, that database record is merged down the levels of the LSM tree. Accordingly, the LSM tree may store various database records for a database key such that the older database records for that key are located in lower levels of the LSM tree then newer database records.

Database servers 514, in various embodiments, are hardware elements, software routines, or a combination thereof capable of providing database services, such as data storage, data retrieval, and/or data manipulation. Accordingly, in some embodiments, database servers 514 execute parser 110, query optimizer 120, and execution engine 130 discussed above. Such database services may be provided by database servers 514 to components (e.g., application servers 522) within MTS 500 and to components external to MTS 500. As an example, a database server 514 may receive a database transaction request from an application server 522 that is requesting data to be written to or read from data storage 512. The database transaction request may specify an SQL SELECT command to select one or more rows from one or more database tables. The contents of a row may be defined in a database record and thus database server 514 may locate and return one or more database records that correspond to the selected one or more table rows. In various cases, the database transaction request may instruct database server 514 to write one or more database records for the LSM tree—database servers 514 maintain the LSM tree implemented on database platform 510. In some embodiments, database servers 514 implement a relational database management system (RDMS) or object-oriented database management system (OODBMS) that facilitates storage and retrieval of information against data storage 512. In various cases, database servers 514 may communicate with each other to facilitate the processing of transactions. For example, database server 514A may communicate with database server 514N to determine if database server 514N has written a database record into its in-memory buffer for a particular key.

Application platform 520, in various embodiments, is a combination of hardware elements and software routines that implement and execute CRM software applications as well as provide related data, code, forms, web pages and other information to and from user systems 550 and store related data, objects, web page content, and other tenant information via database platform 510. In order to facilitate these services, in various embodiments, application platform 520 communicates with database platform 510 to store, access, and manipulate data. In some instances, application platform 520 may communicate with database platform 510 via different network connections. For example, one application server 522 may be coupled via a local area network and another application server 522 may be coupled via a direct network link. Transfer Control Protocol and Internet Protocol (TCP/IP) are exemplary protocols for communicating between application platform 520 and database platform 510, however, it will be apparent to those skilled in the art that other transport protocols may be used depending on the network interconnect used.

Application servers 522, in various embodiments, are hardware elements, software routines, or a combination thereof capable of providing services of application platform 520, including processing requests received from tenants of MTS 500. Application servers 522, in various embodiments, can spawn environments 524 that are usable for various purposes, such as providing functionality for developers to develop, execute, and manage applications. Data may be transferred into an environment 524 from another environment 524 and/or from database platform 510. In some cases, environments 524 cannot access data from other environments 524 unless such data is expressly shared. In some embodiments, multiple environments 524 can be associated with a single tenant.

Application platform 520 may provide user systems 550 access to multiple, different hosted (standard and/or custom) applications, including a CRM application and/or applications developed by tenants. In various embodiments, application platform 520 may manage creation of the applications, testing of the applications, storage of the applications into database objects at data storage 512, execution of the applications in an environment 524 (e.g., a virtual machine of a process space), or any combination thereof. In some embodiments, application platform 520 may add and remove application servers 522 from a server pool at any time for any reason, there may be no server affinity for a user and/or organization to a specific application server 522. In some embodiments, an interface system (not shown) implementing a load balancing function (e.g., an F5 Big-IP load balancer) is located between the application servers 522 and the user systems 550 and is configured to distribute requests to the application servers 522. In some embodiments, the load balancer uses a least connections algorithm to route user requests to the application servers 522. Other examples of load balancing algorithms, such as are round robin and observed response time, also can be used. For example, in certain embodiments, three consecutive requests from the same user could hit three different servers 522, and three requests from different users could hit the same server 522.

In some embodiments, MTS 500 provides security mechanisms, such as encryption, to keep each tenant's data separate unless the data is shared. If more than one server 514 or 522 is used, they may be located in close proximity to one another (e.g., in a server farm located in a single building or campus), or they may be distributed at locations remote from one another (e.g., one or more servers 514 located in city A and one or more servers 522 located in city B). Accordingly, MTS 500 may include one or more logically and/or physically connected servers distributed locally or across one or more geographic locations.

One or more users (e.g., via user systems 550) may interact with MTS 500 via network 540. User system 550 may correspond to, for example, a tenant of MTS 500, a provider (e.g., an administrator) of MTS 500, or a third party. Each user system 550 may be a desktop personal computer, workstation, laptop, PDA, cell phone, or any Wireless Access Protocol (WAP) enabled device or any other computing device capable of interfacing directly or indirectly to the Internet or other network connection. User system 550 may include dedicated hardware configured to interface with MTS 500 over network 540. User system 550 may execute a graphical user interface (GUI) corresponding to MTS 500, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 550 to access, process, and view information and pages available to it from MTS 500 over network 540. Each user system 550 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 500 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 550 may be users in differing capacities, the capacity of a particular user system 550 might be determined one or more permission levels associated with the current user. For example, when a salesperson is using a particular user system 550 to interact with MTS 500, that user system 550 may have capacities (e.g., user privileges) allotted to that salesperson. But when an administrator is using the same user system 550 to interact with MTS 500, the user system 550 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 500 that are allocated at the tenant level while other data structures are managed at the user level.

In some embodiments, a user system 550 and its components are configurable using applications, such as a browser, that include computer code executable on one or more processing elements. Similarly, in some embodiments, MTS 500 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 540 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 550 may communicate with MTS 500 using TCP/IP and, at a higher network level, use other common Internet protocols to communicate, such as HTTP, FTP, AFS, WAP, etc. For example, where HTTP is used, user system 550 might include an HTTP client commonly referred to as a "browser" for sending and receiving HTTP messages from an HTTP server at MTS 500. Such a server might be implemented as the sole network interface between MTS 500 and network 540, but other techniques might be used as well or instead. In some implementations, the interface between MTS 500 and network 540 includes load sharing functionality, such as round-robin HTTP request distributors to balance loads and distribute incoming HTTP requests evenly over a plurality of servers.

In various embodiments, user systems 550 communicate with application servers 522 to request and update system-level and tenant-level data from MTS 500 that may require one or more queries to data storage 512. In some embodiments, MTS 500 automatically generates one or more SQL statements (the SQL query) designed to access the desired information. In some cases, user systems 550 may generate requests having a specific format corresponding to at least a portion of MTS 500. As an example, user systems 550 may request to move data objects into a particular environment 524 using an object notation that describes an object relationship mapping (e.g., a JavaScript object notation mapping) of the specified plurality of objects.

The various techniques described herein and all disclosed or suggested variations, may be performed by one or more computer programs. The term "program" is to be construed broadly to cover a sequence of instructions in a programming language that a computing device can execute or interpret. These programs may be written in any suitable computer language, including lower-level languages such as assembly and higher-level languages such as Python.

Program instructions may be stored on a "non-transitory, computer-readable storage medium" or a "non-transitory, computer-readable medium." The storage of program instructions on such media permits execution of the program instructions by a computer system. These are broad terms intended to cover any type of computer memory or storage device that is capable of storing program instructions. The term "non-transitory," as is understood, refers to a tangible medium. Note that the program instructions may be stored on the medium in various formats (source code, compiled code, etc.).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

Similarly, systems that implement the methods described with respect to any of the disclosed techniques are also contemplated. One such environment in which the disclosed techniques may operate is a cloud computer system. A cloud computer system (or cloud computing system) refers to a computer system that provides on-demand availability of computer system resources without direct management by a user. These resources can include servers, storage, databases, networking, software, analytics, etc. Users typically pay only for those cloud services that are being used, which can, in many instances, lead to reduced operating costs. Various types of cloud service models are possible. The Software as a Service (SaaS) model provides users with a complete product that is run and managed by a cloud provider. The Platform as a Service (PaaS) model allows for deployment and management of applications, without users having to manage the underlying infrastructure. The Infrastructure as a Service (IaaS) model allows more flexibility by permitting users to control access to networking features, computers (virtual or dedicated hardware), and data storage space. Cloud computer systems can run applications in various computing zones that are isolated from one another. These zones can be within a single or multiple geographic regions.

A cloud computer system includes various hardware components along with software to manage those components and provide an interface to users. These hardware components include a processor subsystem, which can include multiple processor circuits, storage, and I/O circuitry, all connected via interconnect circuitry. Cloud computer systems thus can be thought of as server computer systems with associated storage that can perform various types of applications for users as well as provide supporting services (security, load balancing, user interface, etc.).

One common component of a cloud computing system is a data center. As is understood in the art, a data center is a physical computer facility that organizations use to house their critical applications and data. A data center's design is based on a network of computing and storage resources that enable the delivery of shared applications and data.

The term "data center" is intended to cover a wide range of implementations, including traditional on-premises physical servers to virtual networks that support applications and workloads across pools of physical infrastructure and into a multi-cloud environment. In current environments, data exists and is connected across multiple data centers, the edge, and public and private clouds. A data center can frequently communicate across these multiple sites, both on-premises and in the cloud. Even the public cloud is a collection of data centers. When applications are hosted in the cloud, they are using data center resources from the cloud provider. Data centers are commonly used to support a variety of enterprise applications and activities, including, email and file sharing, productivity applications, customer relationship management (CRM), enterprise resource planning (ERP) and databases, big data, artificial intelligence, machine learning, virtual desktops, communications and collaboration services.

Data centers commonly include routers, switches, firewalls, storage systems, servers, and application delivery controllers. Because these components frequently store and manage business-critical data and applications, data center security is critical in data center design. These components operate together provide the core infrastructure for a data center: network infrastructure, storage infrastructure and computing resources. The network infrastructure connects servers (physical and virtualized), data center services, storage, and external connectivity to end-user locations. Storage systems are used to store the data that is the fuel of the data center. In contrast, applications can be considered to be the engines of a data center. Computing resources include servers that provide the processing, memory, local storage, and network connectivity that drive applications. Data centers commonly utilize additional infrastructure to support the center's hardware and software. These include power subsystems, uninterruptible power supplies (UPS), ventilation, cooling systems, fire suppression, backup generators, and connections to external networks.

Data center services are typically deployed to protect the performance and integrity of the core data center components. Data center therefore commonly use network security appliances that provide firewall and intrusion protection capabilities to safeguard the data center. Data centers also maintain application performance by providing application resiliency and availability via automatic failover and load balancing.

One standard for data center design and data center infrastructure is ANSI/TIA-942. It includes standards for ANSI/TIA-942-ready certification, which ensures compliance with one of four categories of data center tiers rated for levels of redundancy and fault tolerance. A Tier 1 (basic) data center offers limited protection against physical events. It has single-capacity components and a single, nonredundant distribution path. A Tier 2 data center offers improved protection against physical events. It has redundant-capacity components and a single, nonredundant distribution path. A Tier 3 data center protects against virtually all physical events, providing redundant-capacity components and multiple independent distribution paths. Each component can be removed or replaced without disrupting services to end users. A Tier 4 data center provides the highest levels of fault tolerance and redundancy. Redundant-capacity components and multiple independent distribution paths enable concurrent maintainability and one fault anywhere in the installation without causing downtime.

Many types of data centers and service models are available. A data center classification depends on whether it is owned by one or many organizations, how it fits (if at all) into the topology of other data centers, the technologies used for computing and storage, and its energy efficiency. There are four main types of data centers. Enterprise data centers are built, owned, and operated by companies and are optimized for their end users. In many cases, they are housed on a corporate campus. Managed services data centers are managed by a third party (or a managed services provider) on behalf of a company. The company leases the equipment and infrastructure instead of buying it. In colocation ("colo") data centers, a company rents space within a data center owned by others and located off company premises. The colocation data center hosts the infrastructure: building, cooling, bandwidth, security, etc., while the company provides and manages the components, including servers, storage, and firewalls. Cloud data centers are an off-premises form of data center in which data and applications are hosted by a cloud services provider such as AMAZON WEB SERVICES (AWS), MICROSOFT (AZURE), or IBM Cloud.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

What is claimed is:

1. A non-transitory computer readable medium having program instructions stored thereon that are capable of causing a computing system to implement operations comprising:

determining, by a query optimizer of a database system, a first query plan to implement a query requesting data from the database system, wherein the determining includes:

selecting, for execution by an execution engine of the database system, one of a plurality of query plans evaluated based on a cost analysis; and caching plan fragments of unselected query plans, wherein the unselected query plans are ones of the plurality of query plans that are not selected for execution, and wherein the caching includes storing the cached plan fragments in an ordering such that the stored cached plan fragments are arranged based on their respective costs as determined by the cost analysis, wherein the storing includes storing ones of the cached plan fragments in a linked list arranged such that a lowest-cost plan fragment is positioned at a head of the linked list; and determining, by the query optimizer, a second query plan for the query by replacing a plan fragment in the first query plan with one of the cached plan fragments of the unselected query plans, wherein the cached plan fragment used in the replacing is selected based on the arranged ordering.

2. The computer readable medium of claim 1, wherein the replacing alters the ordering in which the cached plan fragments are stored.

3. The computer readable medium of claim 1, wherein the operations further comprise:

collecting, by an execution engine of the database system, one or more performance metrics from an execution of the first query plan; and determining the second query plan in response to the one or more performance metrics satisfying one or more criteria.

4. The computer readable medium of claim 3, wherein the execution engine evaluates the one or more performance metrics and replaces the plan fragment in the first query plan with the one cached plan fragment.

5. The computer readable medium of claim 1, wherein the operations further comprise:

receiving, via a user interface, a request to modify the first query plan, wherein determining the second query plan is performed in response to the request.

6. The computer readable medium of claim 1, wherein the operations further comprise:

receiving, with the query, user information identifying a source of the query; and in response to the user information identifying the source as a particular set of users, causing execution of the second query plan to service the query.

7. The computer readable medium of claim 1, wherein the operations further comprise:

storing the second query plan as a pointer array including a plurality of pointers to plan fragments stored in a cache.

8. The computer readable medium of claim 7, wherein a given one of the pointers points to a linked list that includes a selected plan fragment for an action and one or more alternative plan fragments for the action; and wherein the replacing includes altering an ordering of plan fragments in the linked list.

9. The computer readable medium of claim 1, wherein the operations further comprise:

using one or more of the cached plan fragments to determine a third query plan for another query.

10. A method, comprising:

selecting, by a database system, one of a plurality of query plans to execute a query requesting data from the database system;

storing, by the database system, plan fragments of unselected ones of the query plans in a cache, wherein the unselected query plans are ones of the plurality of query plans that are not selected for execution, wherein the stored plan fragments are linked in an ordering determined based on costs of the stored plan fragments, wherein the storing includes storing ones of the plan fragments in a linked list arranged such that a lowest-cost plan fragment is positioned at a head of the linked list;

modifying, by the database system and based on an execution of the selected query plan, the selected query plan by replacing a plan fragment in the selected query plan with one of the plan fragments of the unselected query plans stored in the cache, wherein the plan fragment of the unselected query plan is selected based on the linked ordering; and executing, by the database system, the selected query plan with the replaced plan fragment.

11. The method of claim 10, further comprising:

preserving, by the database system, cost information determined from the selecting of the plurality of query plans, wherein the replacing is based on the cost information.

12. The method of claim 10, wherein the selecting is performed by a query optimizer of the database system; and wherein the modifying is performed by an execution engine of the database system.

13. The method of claim 10, further comprising:

storing, by the database system, the selected query plan as a pointer array including a plurality of pointers to plan fragments stored in the cache, wherein the replacing includes modifying the pointer array.

14. The method of claim 10, further comprising:

determining, by the database system, two query plans for two different queries, wherein the two query plans share one or more plan fragments in the cache.

15. A computing system, comprising:

one or more processors; and memory having program instructions stored thereon that are executable by the one or more processors to cause the computing system to implement a database system performing operations including:

receiving a query requesting data from the database system;

determining a first query plan to implement the query, wherein the determining includes:

selecting, for execution by the database system, one of a plurality of query plans evaluated based on a cost analysis; and caching plan fragments of unselected query plans, wherein the unselected query plans are ones of the plurality of query plans that are not selected for execution, wherein the caching includes storing cached plan fragments in an ordering corresponding to the costs of using the cached plan fragments, wherein the storing includes storing ones of the cached plan fragments in a linked list arranged such that a first plan fragment at a head of the linked list has a lower cost than a second plan fragment at a tail of the linked list; and in response to receiving the query again, determining a second query plan for the query by replacing a plan fragment in the first query plan with one of the cached plan fragments of the unselected query plans, wherein the cached plan fragment used in the replacing is selected based on the stored ordering.

16. The computing system of claim 15, wherein the replacing alters the ordering of plan fragments in the linked list.

17. The computing system of claim 15, wherein the operations further include:

an execution engine of the database system tracking performance metrics from execution of the first query plan; and the execution engine determining the second query plan based on the performance metrics.

18. The computing system of claim 17, wherein the performance metrics are tracked for a given user; and wherein the second query plan is determined for the given user.

19. The computing system of claim 15, wherein the operations further include:

storing the first and second query plans as pointer arrays identifying plan fragments in a cache.

* * * * *